United States Patent [19]
Lin

[11] Patent Number: 6,012,359
[45] Date of Patent: Jan. 11, 2000

[54] GEAR TRANSMISSION CARTRIDGE

[76] Inventor: Ching Chou Lin, No. 150, Sec. 3, Chung San Road., Wu Zh Hsiang, Taichung Hsien, Taiwan

[21] Appl. No.: 09/131,932

[22] Filed: Aug. 10, 1998

[51] Int. Cl.[7] .................................................. B25B 17/00
[52] U.S. Cl. ........................ 81/57.31; 81/57.12; 81/57.14
[58] Field of Search ............................... 81/57.12, 57.31, 81/57.14

[56] References Cited

U.S. PATENT DOCUMENTS

| | | | |
|---|---|---|---|
| 4,043,228 | 8/1977 | Venezio | 81/57.3 |
| 4,627,310 | 12/1986 | Coburn | 74/763 |
| 5,123,308 | 6/1992 | Shaffer | 81/57.31 |
| 5,406,866 | 4/1995 | Badiali | 81/57.3 |

*Primary Examiner*—David A. Schorbel
*Assistant Examiner*—Willie Berry, Jr.

[57] ABSTRACT

A cartridge includes a housing having two orifices for rotatably receiving two stems respectively. The stems each has a gear extended inward of the housing. A gear transmission device is coupled between the gears of the stems for allowing one of the stems to be driven by the other stem with a greater speed, and for allowing the other stem to be driven by the one stem with a greater torque. The gear transmission device includes three gear members rotatably secured in the housing and each having two gear portions of different sizes for engaging with the gears of the stems.

4 Claims, 5 Drawing Sheets

GEAR TRANSMISSION CARTRIDGE

BACKGROUND OF THE INVENTION

1. Field of the Invention

The present invention relates to a cartridge, and more particularly to a cartridge having a gear transmission device for transmission purposes.

2. Description of the Prior Art

A typical speed selectable screw driver is disclosed in U.S. Pat. No. 5,406,866 to Badiali and includes a driving stem rotatably secured in a handle and a gear transmission device disposed in the handle and coupled between the handle and the driving stem for allowing the handle to drive the driving stem. However, two clutch devices are required to be provided in the gear transmission device for allowing the driving stem to be rotated by the handle, such that the tool includes a complicated configuration.

The present invention has arisen to mitigate and/or obviate the afore-described disadvantages of the conventional gear transmission tools.

SUMMARY OF THE INVENTION

The primary objective of the present invention is to provide a cartridge having a gear transmission device for coupling a driving tool to a fastener and for selectively driving the fastener with a greater speed or with an increased torque.

In accordance with one aspect of the invention, there is provided a cartridge comprising a housing including a pair of opposite punctures and a pair of opposite orifices communicating with the punctures respectively, a pair of stems rotatably received in the orifices respectively and each including an engaging hole aligning with the punctures respectively for allowing the engaging holes to receive a fastener, the stems each including a gear extended inward of the housing, and a gear transmission device coupled between the gears of the stems for allowing a first of the stems to be driven by a second of the stem when the second stem is driven by a driving tool, and for allowing the second stem to be driven by the first stem when the first stem is driven by the driving tool.

The gear of the first stem includes a size greater than that of the second stem for allowing the second stem to be rotated in a greater speed by the first stem when the first stem is driven by a driving tool and for allowing the first stem to be rotated in a greater torque by the second stem when the second stem is driven by a driving tool.

The gear transmission device includes at least three gear members rotatably secured in the housing and each having a first gear portion engaged with the gear of the second stem and each having a second gear portion engaged with the gear of the first stem, the first gear portions of the at least three gear members include a size greater than that of the second gear portions for allowing the second stem to be rotated in a greater speed by the first stem and for allowing the first stem to be rotated in a greater torque by the second stem.

The housing includes two recesses formed therein and two plates secured in the recesses respectively, the gear transmission device is secured between the plates.

The housing includes two halves each having a semi-circular projection engaged with each other for preventing the two halves from rotating relative to each other.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
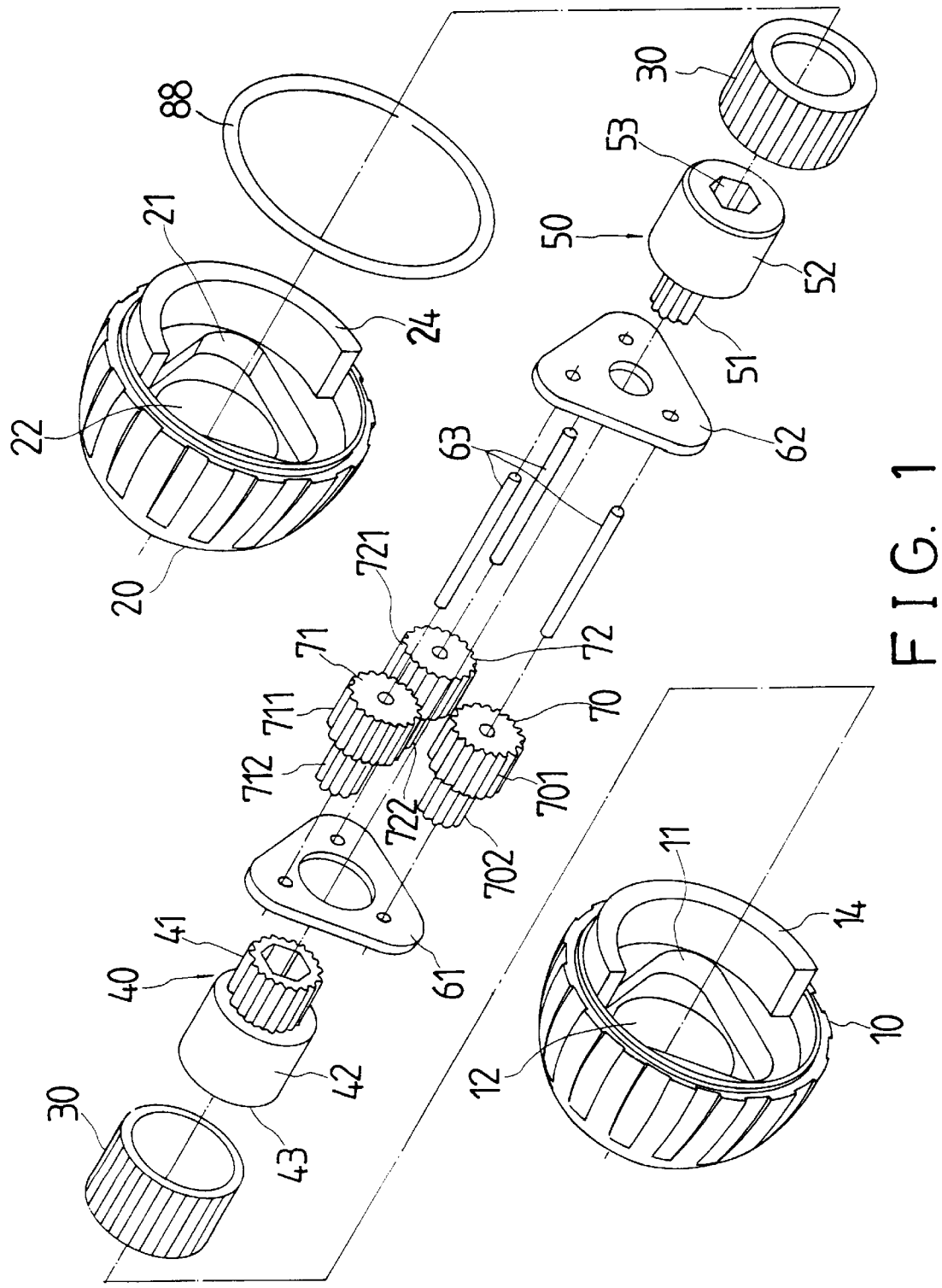
FIG. 1 is an exploded view of a cartridge in accordance with the present invention.
Figure 2:
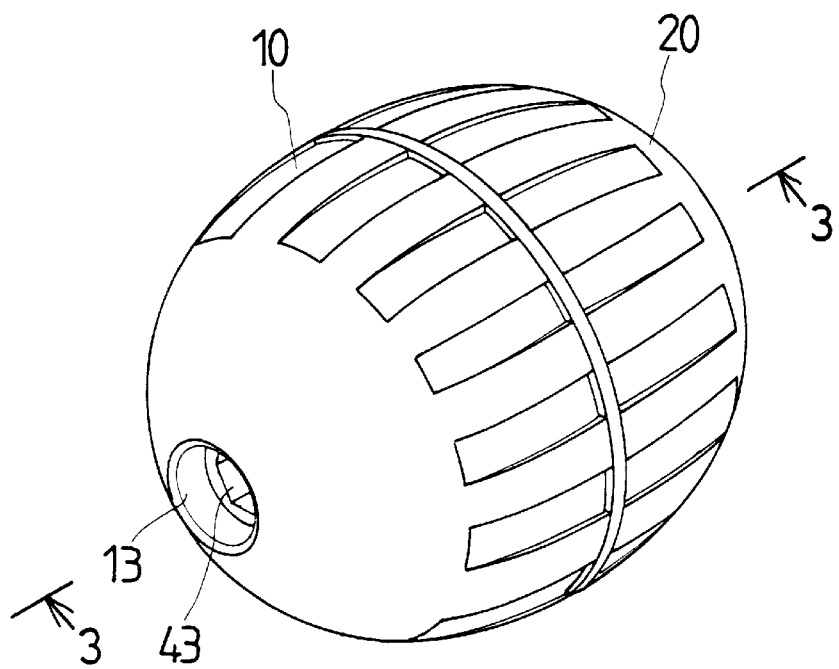
FIG. 2 is a perspective view of the cartridge.
Figure 3:
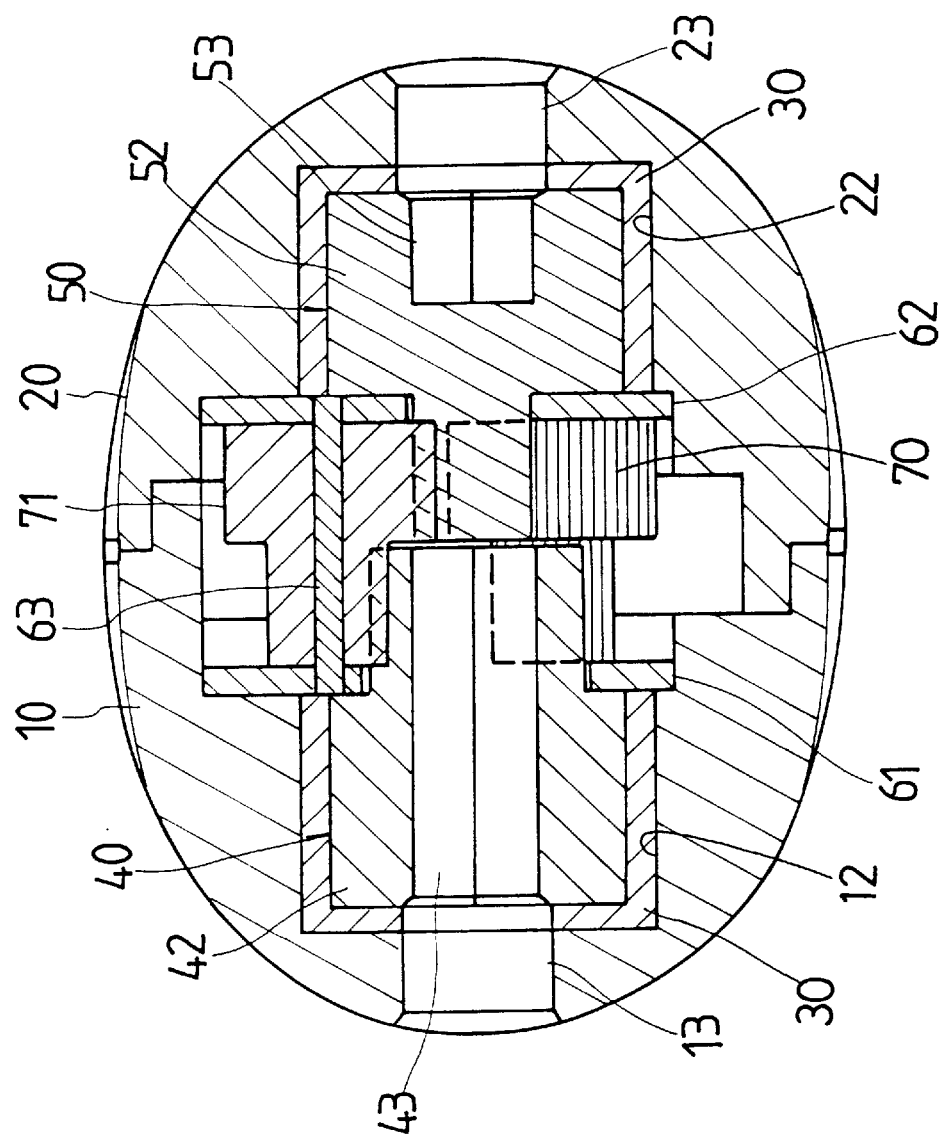
FIG. 3 is a cross sectional view taken along lines 3—3 of FIG. 2.

Referring to the drawings, and initially to FIGS. 1–3, a gear transmission cartridge in accordance with the present invention comprises a housing including two halves 10, 20 secured together by such as a clamping ring 88. The two halves 10, 20 of the housing each includes a triangular recess 11, 21 and an orifice 12, 22 and a puncture 13, 23 communicating with each other and each includes a semi-circular projection 14, 24 engaged with each other for preventing the two halves 10, 20 from rotating relative to each other. The punctures 13, 23 have a size smaller than that of the orifices 12, 22. Two stems 40, 50 each includes a body 42, 52 rotatably received in the orifices 12, 22 of the housing respectively by bearings 30 and each includes an engaging hole 43, 53 aligning with the respective puncture 13, 23 for allowing the tool bits 80 (FIGS. 4, 5) to be engaged with the engaging holes 43, 53. The stem 40 includes a gear 41 extended inward of the housing 10, 20 and the other stem 50 includes a gear or a pinion 51 extended inward of the housing 10, 20.

Figure 6:
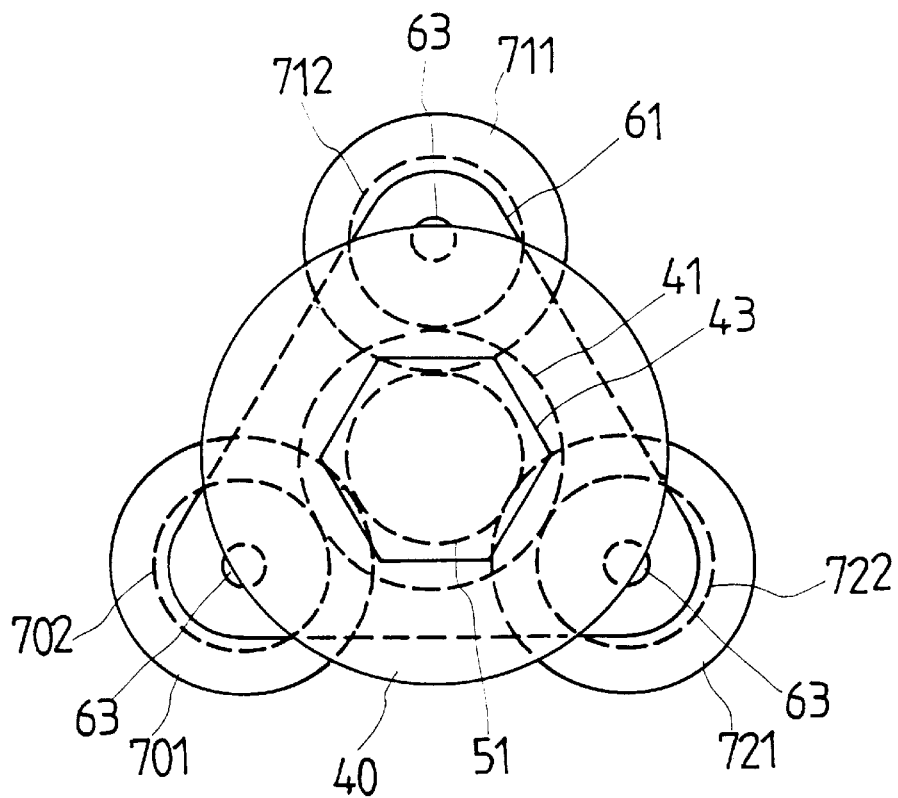
FIG. 6 is a schematic view illustrating the configuration of the gear transmission device.

Two triangular plates 61, 62 are engaged in the recesses 11, 21 respectively and rotated in concert with the housing 10, 20. Three or more gear members 70, 71, 72 are rotatably secured between the plates 61, 62 by pins 63 and each includes a gear portion 701, 711, 721 engaged with the gear or the pinion 51 of the stem 50 and each includes a gear portion or a pinion portion 702, 712, 722 engaged with the gear 41 of the stem 40, best shown in FIG. 6. The gear 41 includes a size greater than that of the gear or the pinion 51, and the gear portions 701, 711, 721 include a size greater than that of the gear or the pinion portions 702, 712, 722 such that the stem 50 may be rotated in a greater speed by the stem 40 via the gear members 70, 71, 72, and such that the stem 40 may be rotated by the stem 50 with a greater torque via the gear members 70, 71, 72.

Figure 4:
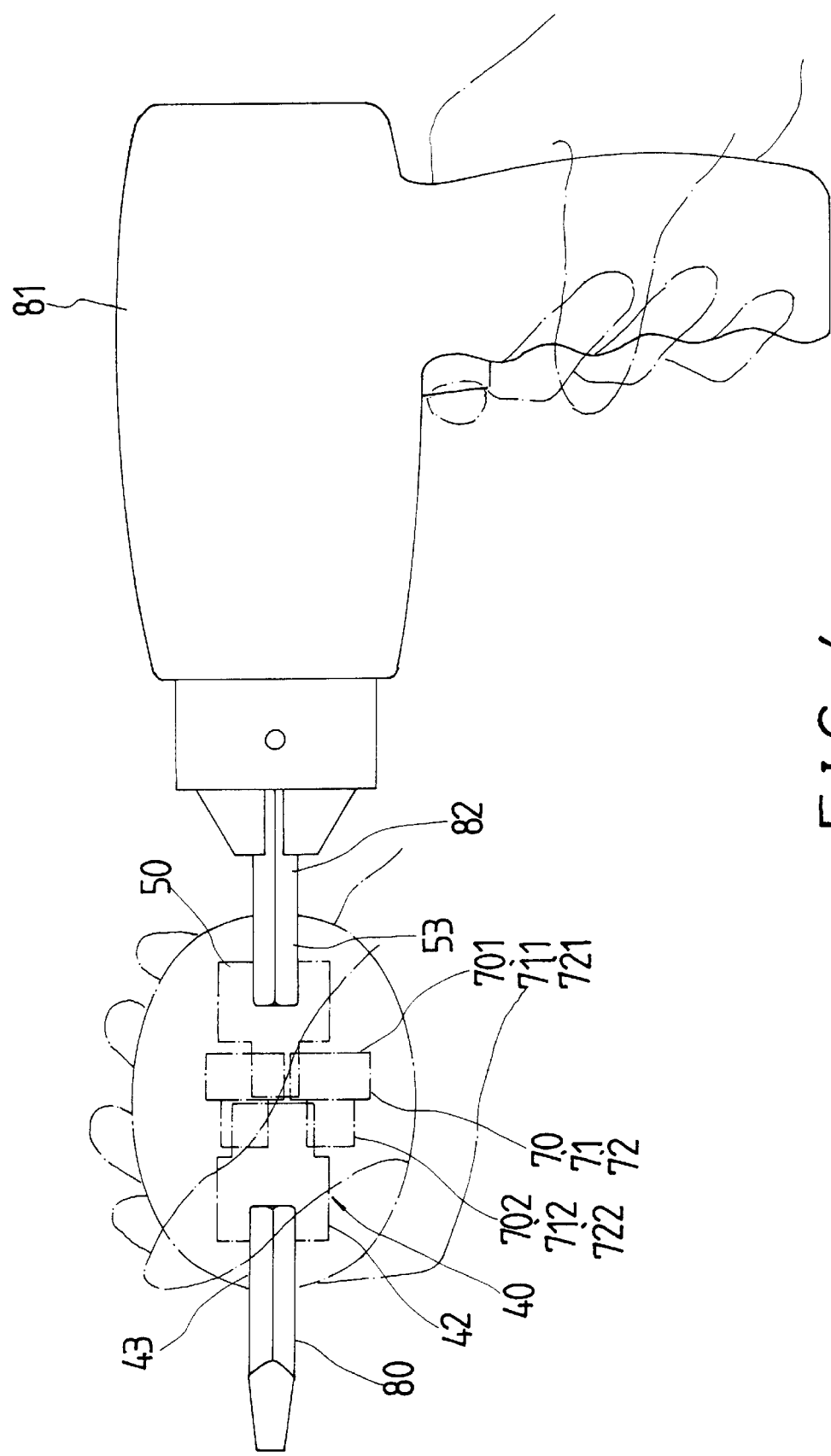
FIGS. 4 and 5 are schematic views illustrating the operation of the cartridge.
Figure 5:
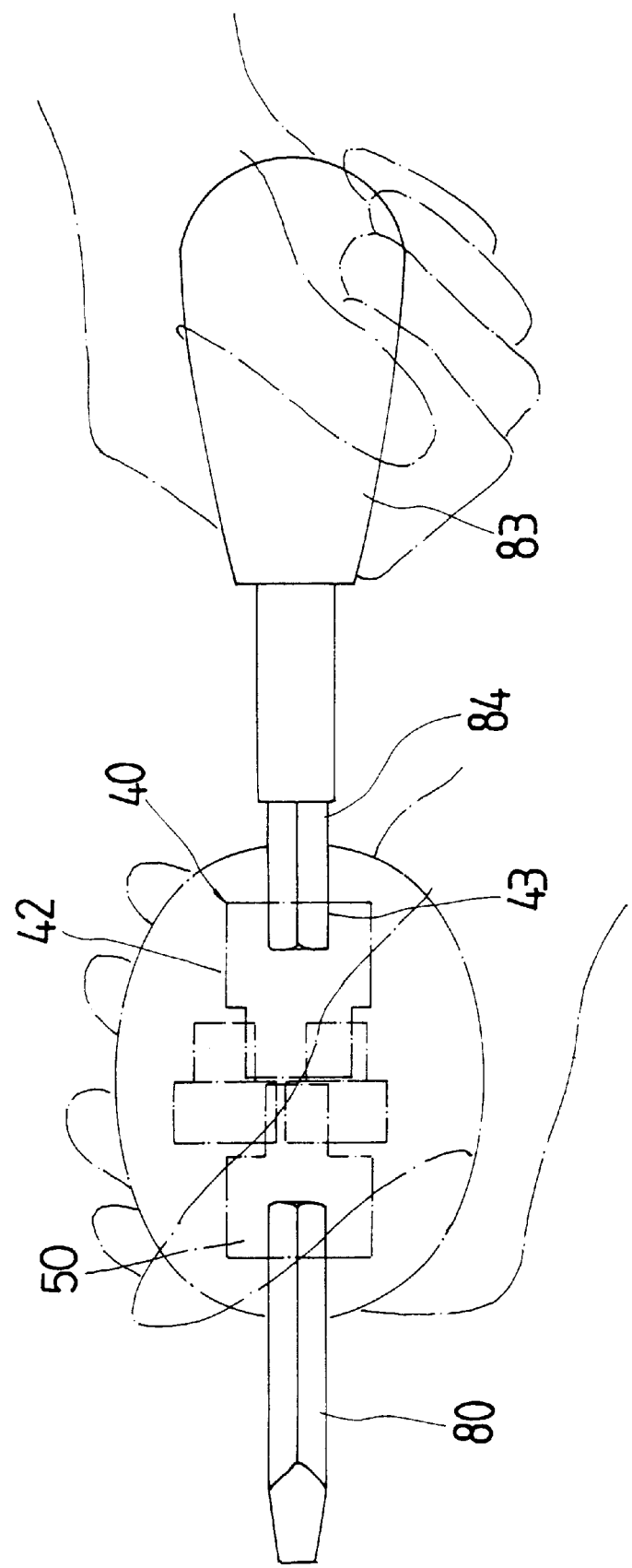

In operation, as shown in FIG. 4, when the tool member 82 of such as a power tool 81 is engaged with the engaging hole 53 of the stem 50, the fastener or the tool bit 80 that is engaged with the engaging hole of the stem 40 may be rotated by the stem 50 with a greater torque via the gear members 70, 71, 72. As shown in FIG. 5, when the tool member 84 of such as a wrench or a screw driver tool 83 is engaged with the engaging hole 43 of the stem 40, the fastener or the tool bit 80 that is engaged with the engaging hole of the stem 50 may be rotated by the stem 40 in a greater speed by the stem 40 via the gear members 70, 71, 72.

It is to be noted that the gear members 70, 71, 72 may be directly secured in the housing without the plates 61, 62.

Accordingly, the cartridge in accordance with the present invention includes a gear transmission device for coupling a driving tool to a fastener and for selectively driving the fastener with a greater speed or with an increased torque.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cartridge comprising:

a housing including a pair of opposite punctures and a pair of opposite orifices communicating with said punctures respectively, a pair of stems rotatably received in said orifices respectively and each including an engaging hole aligning with said punctures respectively for allowing said engaging holes to receive a fastener, said stems each including a gear extended inward of said housing, and a gear transmission device coupled between said gears of said stems for allowing a first of said stems to be driven by a second of said stem when said second stem is driven by a driving tool, and for allowing said second stem to be driven by said first stem when said first stem is driven by the driving tool, said housing including two recesses formed therein and two plates secured in said recesses respectively, said gear transmission device being secured between said plate.

2. The cartridge according to claim 1, wherein said gear of said first stem includes a size greater than that of second stem for allowing said second stem to be rotated in a greater speed by said first stem and for allowing said first stem to be rotated in a greater torque by said second stem.

3. The cartridge according to claim 1, wherein said gear transmission device includes at least three gear members rotatably secured in said housing and each having a first gear portion engaged with said gear of said second stem and each having a second gear portion engaged with said gear of said first stem, said first gear portions of said at least three gear members include a size greater than that of said second gear portions for allowing said second stem to be rotated in a greater speed by said first stem and for allowing said first stem to be rotated in a greater torque by said second stem.

4. A cartridge comprising:

a housing including a pair of opposite punctures and a pair of opposite orifices communicating with said punctures respectively, said housing including two halves each having a semi-circular projection engaged with each other for preventing said two halves from rotating relative to each other, a pair of stems rotatably received in said orifices respectively and each including an engaging hole aligning with said punctures respectively for allowing said engaging holes to receive a fastener, said stems each including a rear extended inward of said housing, and a gear transmission device coupled between said gears of said stems for allowing a first of said stems to be driven by a second of said stem when said second stem is driven by a driving tool, and for allowing said second stem to be driven by said first stem when said first stem is driven by the driving tool.

\* \* \* \* \*